I. N. MARK.
TRUCK DUMP.
APPLICATION FILED JAN. 22, 1921.

1,410,943. Patented Mar. 28, 1922.
3 SHEETS—SHEET 3.

Inventor
Isaac N. Mark.
By his Attorneys

UNITED STATES PATENT OFFICE.

ISAAC N. MARK, OF BURLINGTON, KANSAS.

TRUCK DUMP.

1,410,943.  Specification of Letters Patent.  Patented Mar. 28, 1922.

Application filed January 22, 1921. Serial No. 439,170.

*To all whom it may concern:*

Be it known that I, ISAAC N. MARK, a citizen of the United States, residing at Burlington, in the county of Coffey and State of Kansas, have invented certain new and useful Improvements in Truck Dumps, of which the following is a specification, reference being had therein to the accompanying drawings.

This invention relates to a truck dump, and has for its object the provision of a simple and efficient means for raising and lowering the truck box or body.

Another object of the invention is the production of a simple and efficient hoisting device in combination with the side-sills of a vehicle or truck and the hinged or pivotally mounted truck box or body carried by the sills.

With these and other objects in view, my invention comprises certain novel combinations, constructions and arrangements of parts as will be hereinafter described, illustrated in the accompanying drawings, and more particularly pointed out in the appended claim.

In the drawings:

Figure 1 is a perspective view of an apparatus constructed in accordance with the present invention shown in a closed or normal position, while

Figure 4 is an enlarged fragmentary view, in side elevation, of the locking pawl and its co-operating parts.

Figure 7 is a fragmentary, perspective view of my apparatus, showing another embodiment of the locking pawl and ratchet device.

Figure 1:
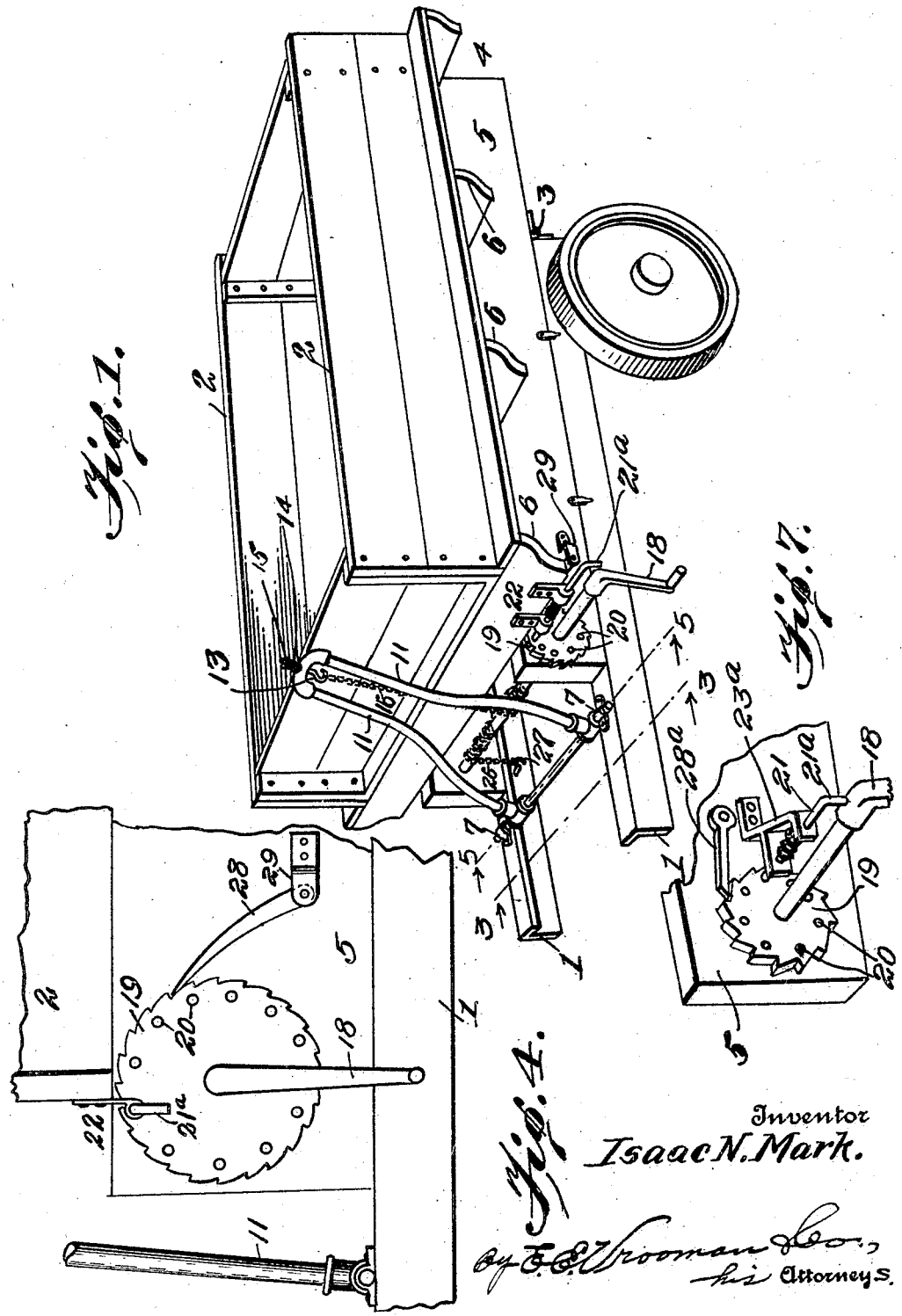

Referring to the drawings by numerals, 1 designates the side-sills of a motor truck, and 2 is the truck box or body, mounted by means of a hinged connection, at 3, upon the sills 1; these sills 1 constitute a frame and in claiming this invention, I do not limit myself merely to the term "sills." The truck box or body includes a base structure 4; this base structure 4 comprises longitudinally-extending side beams 5, upon which are mounted the transverse beams 6.

Figure 5:
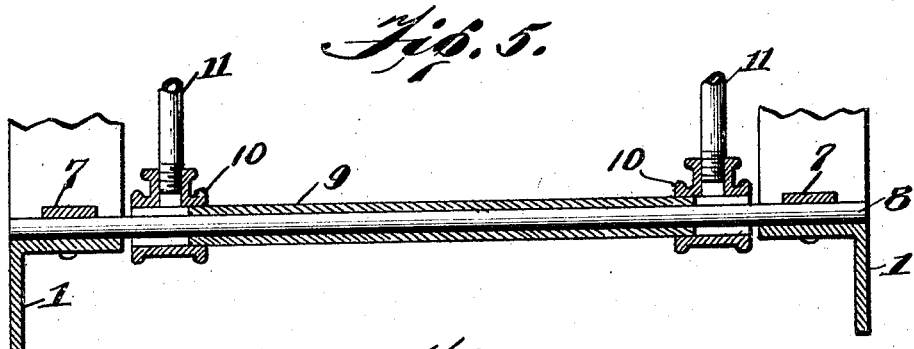
Figure 5 is a sectional view, taken on line 5—5, Fig. 1.
Figure 6:
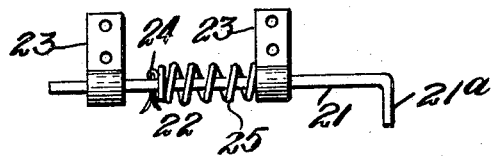
Figure 6 is an enlarged view, in elevation, of the locking device for the ratchet disc.

The hoisting device includes horizontal brackets 7 fastened to the top of the side-sills 1; and journaled under these brackets 7 is a rod 8. Rotatably mounted on rod 8, between the inner edges of sills 1, is a tubing 9; fastened to the ends of the tubing 9 are sleeves 10, Fig. 5; these sleeves 10 are threaded upon the ends of tubing 9 and can quickly be detached, if it is desired to disassemble the hoisting device, or to replace parts when worn. Side bars 11 are threaded, at their lower ends, into the sleeve 10, and their upper ends extend into a yoke member 12; it is to be noted that the tubing 9, sleeves 10, bars 11, and yoke member 12 constitute a yoke device of a specific and peculiar structure, pivotally mounted upon the rod 8.

Figure 3:
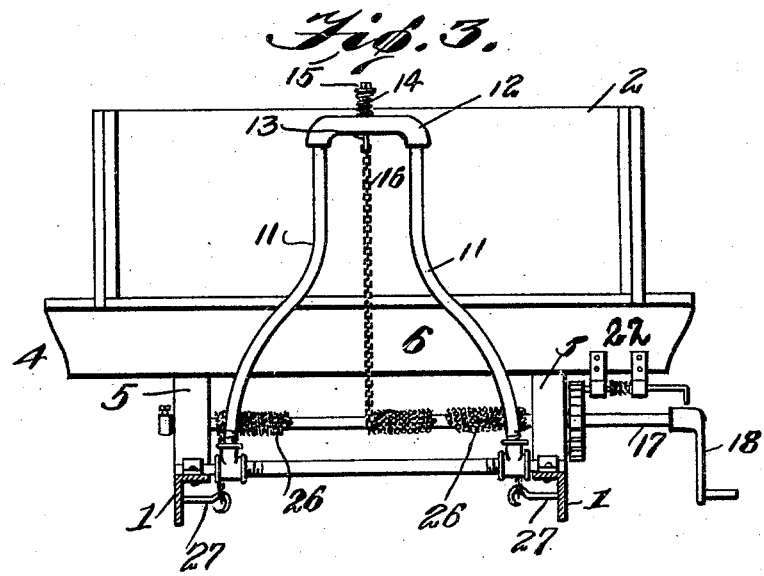
Figure 3 is a transverse section, taken on line 3—3, Fig. 1, and looking in the direction of the arrows.

A hook 13 is slidably mounted upon the central part of the yoke member, the hook having a spring 14, Fig. 3, thereon, between the yoke member 12 and the nut and washer 15.

Lifting chain 16 is connected at its upper or outer end to hook 13, and its lower end is fastened around the windlass rod 17. This rod 17 is journaled upon the inner ends of the side beams 5, and one end is provided with an operating handle 18. A ratchet disc 19 is fixedly secured to rod 17, contiguous to the outer face of one of the beams 5, and this disc is provided with a circular row of sockets or apertures 20 for receiving the inner end of the locking rod 21 of the locking device 22. This locking device 22 includes rod 21 slidably mounted in brackets 23, which brackets are fastened to the front face of the inner, transverse beam 6. A cotter pin 24 is placed upon rod 21 between the brackets 23, and a coil spring 25 is placed on rod 21 between one of the brackets and the cotter pin, so that at all times the rod 21 has a tendency to enter one of the sockets or apertures 20, by reason of the inner end of the rod pressing against the surface of the outer face of the ratchet disc 19 when not actually seated in a socket or aperture 20; the operator, by grasping the handle-end 21ª of the rod 21, can quickly release the ratchet disc 19 by withdrawing the inner end of rod 21 from engagement with the disc, but by means of locking device 22, the rotation of the windlass rod 17 can be prevented, thereby retaining the truck box 2 in a fixed position.

Anchoring chains 26 have their outer ends fastened to hooks 27, which hooks are attached to the inner faces or sills 1; the inner ends of the anchoring chains 26 are wrapped around and fastened to the windlass rod 17. These chains will limit the rearward tilting of the box and will relieve the chain 16 from such strain.

Figure 2:
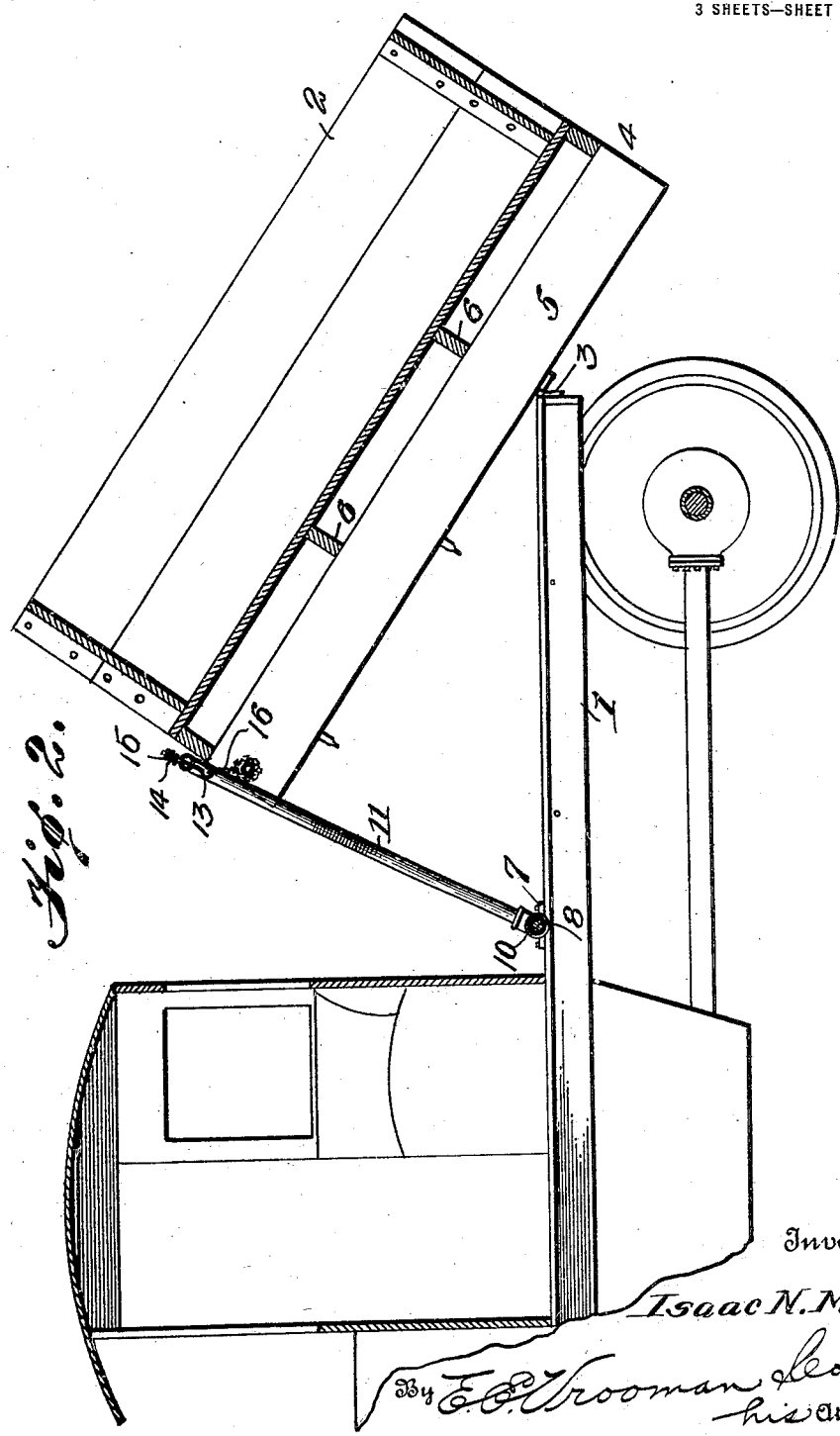
Figure 2 is a longitudinal sectional view of the apparatus, showing the truck box or body in a raised or dumping position.

When the apparatus is in the position shown in Fig. 1, the operator releases the ratchet disc 19 by drawing outwardly on the handle 21ª of the locking device 22, then, by rotating the windlass rod 17 in one direction, the box 2 will be raised to its tilting position, Fig. 2, thereby permitting the load to be dumped from the rear end of the box. As the load settles toward the rear end of the box, the tendency of the box will be to swing higher at its forward end, but this action will be prevented by the anchoring chains 26. If some of the load is retained in the box, so that the weight of the box and load at the rear of the hinges 3 is greater than the portion of the box in front of the hinges, the chains 26 will also start the forward end of the box to descend, when the chains are reeled upon the windlass rod 17 when it is turned in a reversed direction. Ordinarily, by reversing the rotation of the windlass, the chain 16 will be unreeled from the windlass rod, thereby allowing the box to descend down to its normal horizontal position, resting upon the sills 1, as shown in Fig. 1.

It is apparent that when the lifting chain 16 is being reeled upon the windlass rod 17, the anchoring chains 26 are being unreeled therefrom and vice versa.

A locking pawl 28 (Fig. 4) is provided for preventing accidental rotation of the ratchet disc in one direction. This pawl 28 is journaled upon bracket 29.

In Fig. 7, I have shown another embodiment of the locking pawl and ratchet device in which an angle bracket 23ª is secured in a horizontal position to one of the side beams 5; the locking rod 21 is slidably mounted upon this bracket, with the coil spring on the rod between parts of the bracket. A locking pawl 28 is pivotally mounted on the beam 5 and engages the ratchet disc 19.

When the ratchet disc 19 is being rotated by the swinging of the crank 18, the operator can grip the handle-end 21ª and hold the rod 21 from engagement with the ratchet disc 19 and at the time the pawl 28 will prevent the disc from rotation in one direction. When the rod 21 is released it will enter one of the sockets 20 and positively lock the disc against rotation. The pawl may then be disengaged from the disc. Normally it will only be necessary to pull the rod from engagement with the disc to allow the box 2 to swing down onto the frame. The pawl may then be swung into engagement with the ratchet disc.

My hoisting device is simple in construction and comparatively easy for one man to operate, and action of the device is positive and efficient, in moving the box to a dumping position, or returning it to and holding it securely in the horizontal position upon the side-sills or platform of the truck.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claim.

What I claim is:

In an apparatus of the class described, the combination of a frame and a box member hinged thereon, a windlass rod journaled on said box member, a ratchet disc fixedly secured to said windlass rod, said ratchet disc provided with sockets or apertures, a locking device fastened to said box member, said locking device including a spring-pressed rod adapted to enter said apertures of the ratchet disc for holding the ratchet disc against rotation, and means connected to the windlass rod and to the frame for raising the box member.

In testimony whereof I hereunto affix my signature.

ISAAC N. MARK.